United States Patent
Bayazit et al.

(10) Patent No.: US 7,677,400 B2
(45) Date of Patent: Mar. 16, 2010

(54) CABLE MANAGEMENT ASSEMBLY, SYSTEM AND METHOD

(75) Inventors: Yilmaz Bayazit, Minneapolis, MN (US); Chad J. Sjodin, Shakopee, MN (US); David E. Rapp, Eden Prairie, MN (US); Daniel M. Herzog, Chanhassen, MN (US); Chad A. Raskovich, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 365 days.

(21) Appl. No.: 11/101,143

(22) Filed: Apr. 7, 2005

(65) Prior Publication Data

US 2006/0228087 A1   Oct. 12, 2006

(51) Int. Cl.
*A47F 7/00* (2006.01)
*G02B 6/00* (2006.01)

(52) U.S. Cl. .......................................... 211/26; 385/135

(58) Field of Classification Search .................... 211/26, 211/85.5, 59.3, 57.1, 49.1, 54.1, 59.1; 248/220.31, 248/220.41, 220.42, 220.43
See application file for complete search history.

(56) References Cited

U.S. PATENT DOCUMENTS

| | | | |
|---|---|---|---|
| 693,127 A | 2/1902 | Gardner et al. | |
| 1,751,463 A | 3/1930 | Backus et al. | |
| 2,814,894 A * | 12/1957 | Horton ........................ | 40/489 |
| 2,913,210 A | 11/1959 | Tichnor | |
| 3,159,368 A | 12/1964 | Ahlbin et al. | |
| 3,204,776 A | 9/1965 | Brown et al. | |
| 3,315,816 A | 4/1967 | Mallory | |
| 3,388,806 A | 6/1968 | Cunningham, Jr. et al. | |
| 3,420,482 A | 1/1969 | Taylor | |
| 3,512,653 A | 5/1970 | Erismann | |
| 3,516,552 A | 6/1970 | Salava | |
| 3,986,318 A | 10/1976 | McConnell | |
| 4,303,217 A * | 12/1981 | Garfinkle ................ | 248/220.42 |
| 4,405,108 A | 9/1983 | Muirhead | |
| 4,441,619 A * | 4/1984 | Gibitz ........................ | 211/70.6 |
| 4,527,760 A | 7/1985 | Salacuse | |

(Continued)

FOREIGN PATENT DOCUMENTS

EP   1 160 605 A2   5/2001

(Continued)

OTHER PUBLICATIONS

Exhibit A: "Next Generation Frame (NGF) Product Family Ordering Guide," *ADC Telecommunications, Inc.*, 2 pages (Oct. 1998).

(Continued)

*Primary Examiner*—Katherine W Mitchell
*Assistant Examiner*—Jeremy C Ramsey
(74) *Attorney, Agent, or Firm*—Merchant & Gould P.C.

(57) ABSTRACT

A cable management assembly, and method related thereto, including a panel having an interface portion. The interface portion having a plurality of discrete openings, including first and second shaped apertures. The assembly further including cable management devices having securing structure including a flexible tab and a locating element. The securing structure being configured to mount the cable management devices at selected vertical and horizontal locations on the panel. The cable management assembly being configured to mount between two adjacent telecommunication racks or to an end of a telecommunication rack.

33 Claims, 7 Drawing Sheets

U.S. PATENT DOCUMENTS

| | | | |
|---|---|---|---|
| 4,619,428 A | 10/1986 | Bailey | |
| 4,681,233 A | 7/1987 | Roth | |
| 4,768,660 A * | 9/1988 | Handler et al. | 211/106.01 |
| 5,143,331 A | 9/1992 | Robert | |
| 5,163,567 A | 11/1992 | Betts, Sr. | |
| 5,165,640 A * | 11/1992 | Williams, 3rd | 248/220.43 |
| 5,379,976 A | 1/1995 | DeGirolamo | |
| 5,420,762 A | 5/1995 | Lewis | |
| 5,588,631 A | 12/1996 | Yee | |
| 5,640,482 A | 6/1997 | Barry et al. | |
| 5,653,349 A | 8/1997 | Dana et al. | |
| 5,738,020 A | 4/1998 | Correia | |
| 5,758,002 A | 5/1998 | Walters | |
| 5,778,130 A | 7/1998 | Walters et al. | |
| 5,785,190 A | 7/1998 | Otema | |
| 5,791,502 A | 8/1998 | Bietz et al. | |
| 5,930,972 A * | 8/1999 | Benner et al. | 52/653.1 |
| 6,003,685 A * | 12/1999 | Malin | 211/7 |
| 6,115,977 A * | 9/2000 | Hornberger et al. | 52/238.1 |
| 6,123,400 A * | 9/2000 | Nicolai et al. | 312/265.1 |
| 6,129,316 A | 10/2000 | Bauer | |
| 6,131,347 A * | 10/2000 | Hornberger et al. | 52/238.1 |
| 6,170,673 B1 * | 1/2001 | Nicolai | 211/26 |
| 6,189,847 B1 | 2/2001 | Hart | |
| 6,193,198 B1 | 2/2001 | Baur et al. | |
| 6,238,028 B1 * | 5/2001 | Benner et al. | 312/265.3 |
| 6,266,250 B1 * | 7/2001 | Foye | 361/760 |
| 6,267,254 B1 * | 7/2001 | Chen | 211/26 |
| 6,270,281 B1 * | 8/2001 | Ruusuvuori | 403/11 |
| 6,282,854 B1 * | 9/2001 | Vos et al. | 52/239 |
| 6,289,618 B1 * | 9/2001 | Kump et al. | 40/657 |
| 6,352,164 B1 | 3/2002 | Hyatte et al. | |
| 6,363,198 B1 | 3/2002 | Braga et al. | |
| 6,397,533 B1 * | 6/2002 | Hornberger et al. | 52/239 |
| 6,398,149 B1 | 6/2002 | Hines et al. | |
| 6,405,984 B1 | 6/2002 | Simons et al. | |
| 6,423,898 B1 * | 7/2002 | Croker | 174/50 |
| 6,443,320 B1 | 9/2002 | Herzog et al. | |
| 6,481,583 B1 * | 11/2002 | Black et al. | 211/70.6 |
| D467,793 S * | 12/2002 | Zadak | D8/373 |
| D469,003 S * | 1/2003 | Valiulis | D8/380 |
| 6,516,955 B1 * | 2/2003 | Dudhwala et al. | 211/26 |
| 6,581,788 B1 | 6/2003 | Winig et al. | |
| 6,595,379 B1 | 7/2003 | Powell | |
| 6,684,583 B2 * | 2/2004 | Hodges et al. | 52/220.7 |
| 7,070,021 B1 * | 7/2006 | McKinney | 182/92 |
| 7,083,051 B2 * | 8/2006 | Smith et al. | 211/26 |
| 7,219,808 B2 * | 5/2007 | Wright et al. | 211/70.6 |
| 2002/0037193 A1 * | 3/2002 | Gibbons et al. | 403/344 |
| 2004/0094491 A1 | 5/2004 | Smith et al. | |
| 2006/0171651 A1 | 8/2006 | Laursen | |

FOREIGN PATENT DOCUMENTS

| | | |
|---|---|---|
| FR | 2 701 345 A1 | 8/1994 |
| WO | WO 01/01534 A1 | 1/2001 |
| WO | WO 02/052866 A2 | 7/2002 |

OTHER PUBLICATIONS

Exhibit B: "Fiber Panel Products, Second Edition," *ADC Telecommunications, Inc.*, 3 pages (Jul. 1996).

Exhibit C: "Fiber Cable Management Products, Third Edition," *ADC Telecommunications, Inc.*, 8 pages (Jun. 1998).

Exhibit D: "Value-Added Module System," *ADC Telecommunications, Inc.*, 2 pages (Jun. 1998).

* cited by examiner

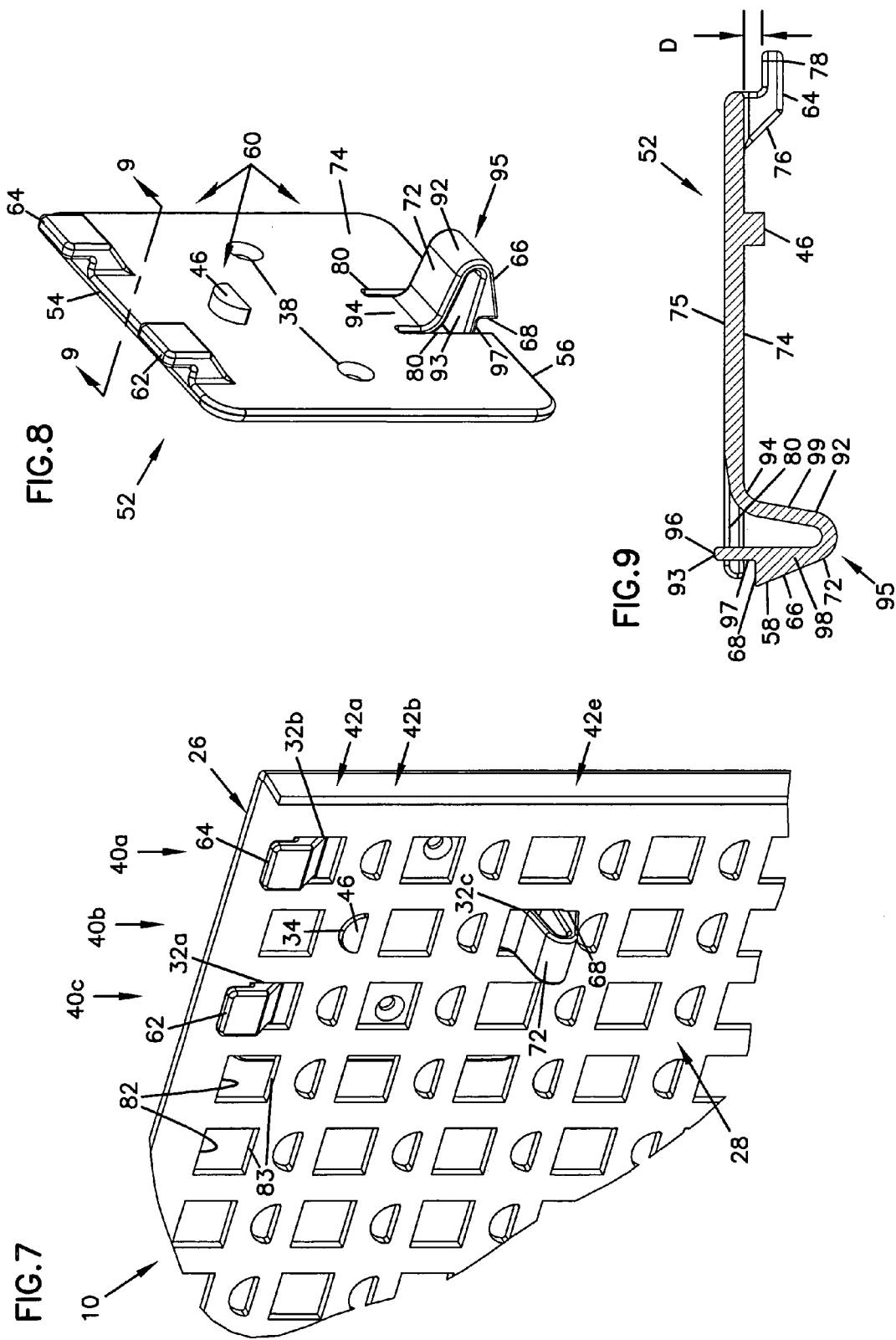

CABLE MANAGEMENT ASSEMBLY, SYSTEM AND METHOD

TECHNICAL FIELD

The present invention relates generally to devices and methods for enhancing cable management of telecommunications systems. More particularly, the present invention relates to a cable management panel for managing cables of telecommunications systems.

BACKGROUND

Telecommunications systems utilize cables, such as fiber optic cables or copper twisted pair cables, for interconnecting pieces of telecommunications equipment or components. The systems commonly include telecommunication racks that hold a variety of different pieces of telecommunications equipment. Often thousands of cables are used to interconnect the various pieces of telecommunications equipment mounted on the racks.

Because of the large number of cables associated with telecommunications equipment, cable management is crucial. Cable management involves efficiently routing cables to minimize the occupied space, and routing cables in an orderly manner so as to reduce the likelihood of cable tangling. Ease of cable organization is also a factor related to effective cable management.

Cable management is also important in preventing damage to the cables. Unnecessary or excessive bending of fiber optic cables, for example, is undesirable. Bending of fibers can cause attenuation and loss of signal strength. As the fiber bends, the fiber can also break, resulting in complete loss of signal transmission through the fiber.

In general, conventional arrangements for managing cable can be improved.

SUMMARY

One aspect of the present invention relates to a cable management panel including an interface portion and mounting flanges located along the sides of the interface portion. The interface portion defines a repeated pattern of first shaped apertures and second shaped apertures that spans across a majority of the width of the interface portion, and that extends along a majority of the length of the interface portion.

Another aspect of the present invention relates to a cable management assembly including a panel and a fiber optic cable management device. The panel defines a plurality of discrete openings including first shaped apertures and second shaped apertures. Securing structure of the fiber optic cable management device detachably secures the device at a selected location on the panel. The securing structure engages at least one of the first shaped apertures and one of the second shaped apertures when the device is detachably secured to the panel.

Still another aspect of the present invention relates to a method of assembling a cable management assembly. The method includes detachably mounting a cable management device at a selected location on the panel by engaging a hook attachment of the device to an edge of a first shaped aperture on a panel. The method further includes pivoting the device about the edge of the first shaped aperture on the panel, engaging a flexible tab of the device with another first shaped aperture on the panel, and engaging a locating element of the device with a second shaped aperture on the panel. The flexible tab of the securing structure snap-fits within the first shaped aperture to secure the cable management device to the panel at the selected location.

A variety of aspects of the invention are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are exemplary and explanatory only, and are not restrictive of the claimed invention.

BRIEF DESCRIPTION OF THE DRAWINGS

FIG. 7 is a partial, rear perspective view of the cable management assembly of FIG. 6;

FIG. 8 is a rear perspective view of a back plate of a cable management device shown in FIG. 4; and FIG. 9 is a cross-sectional view of the back plate of FIG. 8, taken along line 9-9.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
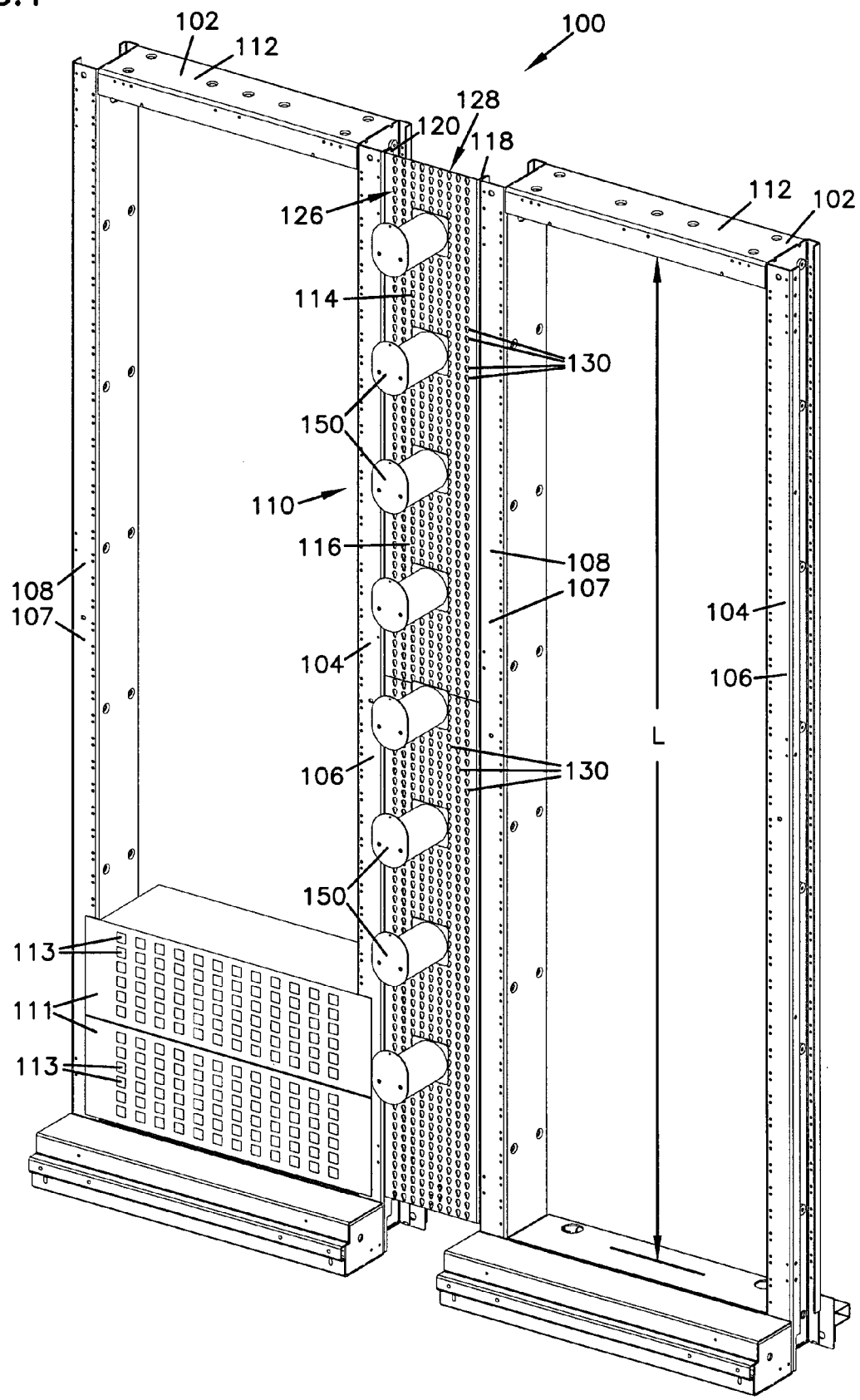
FIG. 1 is a front perspective view of a cable management system.

Referring to FIG. 1, a telecommunications system 100 for managing cables interconnected to telecommunications components is illustrated. The telecommunications system 100 is described in U.S. patent application Ser. No. 10/295,169, having Publication No. 20040094491, which application is incorporated herein by reference. The telecommunications system 100 includes a cable management assembly 110 mounted between adjacent first and second telecommunication racks 112. In alternative embodiments, the cable management assembly 110 can be used with other telecommunication structures to manage cables. For example, the cable management assembly 110 can be mounted within a cabinet or within a termination panel.

Each of the illustrated telecommunication racks 112 of FIG. 1 generally includes a frame 102 having a first side column 104 and a second side column 108. The first side column 104 defines a first end 106 of the telecommunication rack 112 and the second side column 108 defines a second end 107 of the telecommunication rack 112.

The telecommunication racks 112 can be configured to receive a variety of telecommunications components. For example, the racks 112 can hold fiber terminations panels 111 that hold fiber optic adapters 113. Cables having terminating connectors (not shown) are connected together at the adapters 113.

The cable management assembly 110 includes a cable management structure 114. The cable management structure 114 can be referred to as a back plane, riser, or panel. The panel 114 includes an interface portion 116 and first and second mounting structures 118, 120 configured to mount or couple the cable management assembly 110 to the adjacent telecommunication racks 112. In one embodiment, as shown in FIG. 1, the first and second mounting structures 118, 120 include flanges that extend generally outward from the interface portion 116 of the panel 114. Fasteners, such as rivets or screws, can be used to mount the panel 114 to the ends 106, 107 of the telecommunication racks 112.

The interface portion 116 of the panel 114 has a front side 126 and a back side 128. A plurality of discrete openings 130 extends through the interface portion from the front side 126 to the back side 128. Cable management devices 150 secure to the panel 114 at the discrete openings 130 via various attachment means. The discrete openings 130 and the cable management devices 150 are configured so that a user can organize and arrange cables (not shown) at selected locations along the panel 114.

The cable management assembly 110 permits a user to configure the system to a particular need, and thereby reduces costs associated with fixed or custom-made cable management systems. Preferably, a user has the flexibility to choose from a number of different cable management devices 150, each configured to secure to the panel 114.

Figure 2:
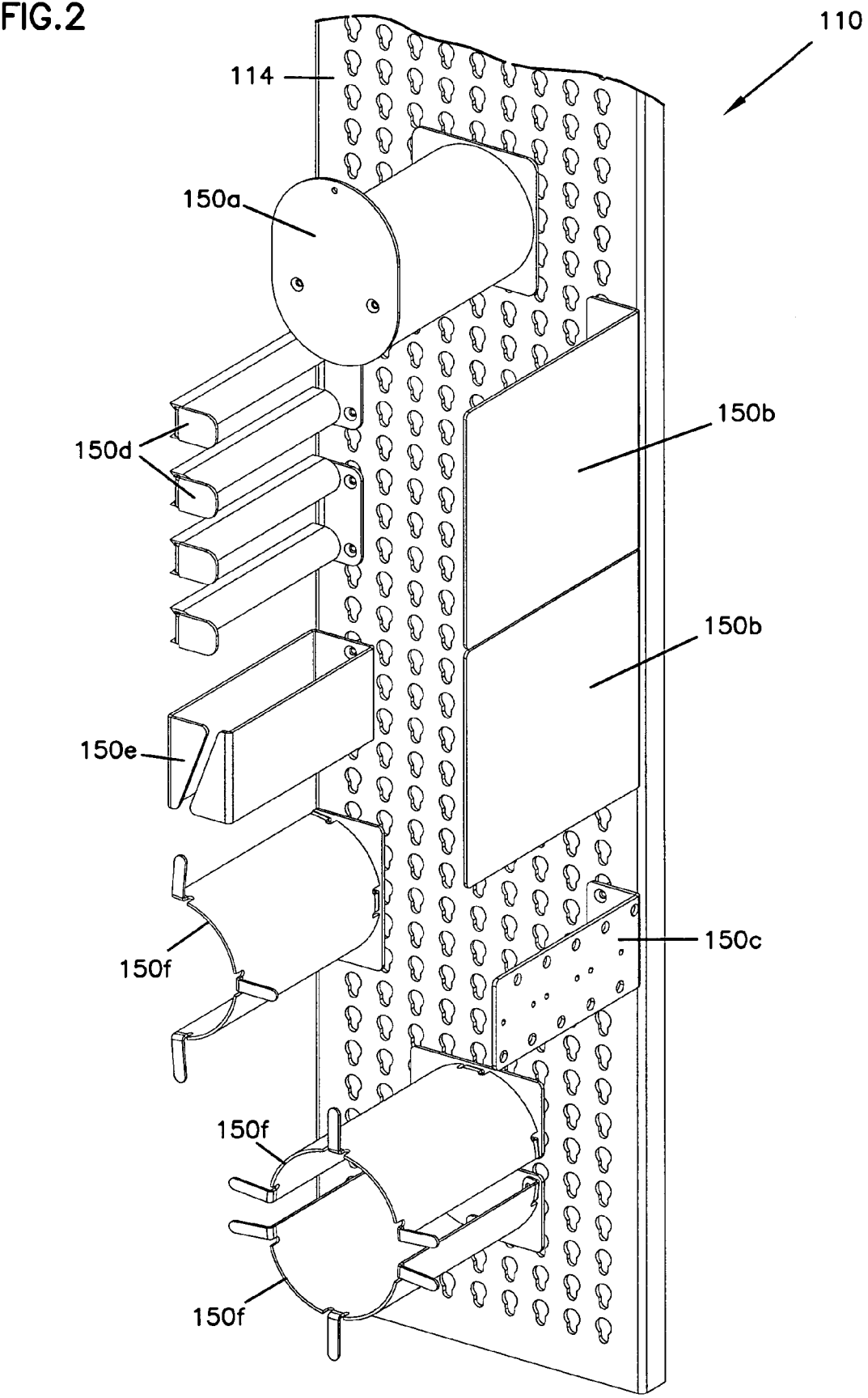
FIG. 2 is a front perspective view of a cable management assembly shown in the cable management system of FIG. 1, illustrating various embodiments of cable management devices.

FIG. 2 illustrates some of a variety of cable management devices 150 that can be used in the cable management system 100. One of the exemplary cable management devices 150 is a spool 150a. Spools can be of varying sizes and are used to hold excess cabling. Other cable management devices 150 can include, for example, cable guides 150b that contain or guide cabling; tie-off brackets 150c to which cabling can be secured; finger devices or edge protections 150d that organize and protect cables routed between the panel 114 and the components mounted on the telecommunication racks 112 (FIG. 1); channel guides 150e that contain cabling; and radius limiters 150f that limit the bend radius of stored cabling. Further, other types of cable management devices 150 may include cable termination devices (not shown) for terminating fiber optic or ribbon cables at the panel 114, or flip-out trays (not shown) for storing cable slack. It is to be understood that the spool 150a, and the other illustrated devices 150a-150f are only examples of the various types of cable management devices that can be used in the cable management system 100.

As shown in FIG. 2, the cable management devices 150 and the panel 114 are configured to permit a user to position any of the different cable management devices 150 at any location on the panel 114 of the cable management assembly 110. By this, a user may select one or more devices from the number of devices and position the devices as desired to configure the system to meet a particular need.

Figure 3:
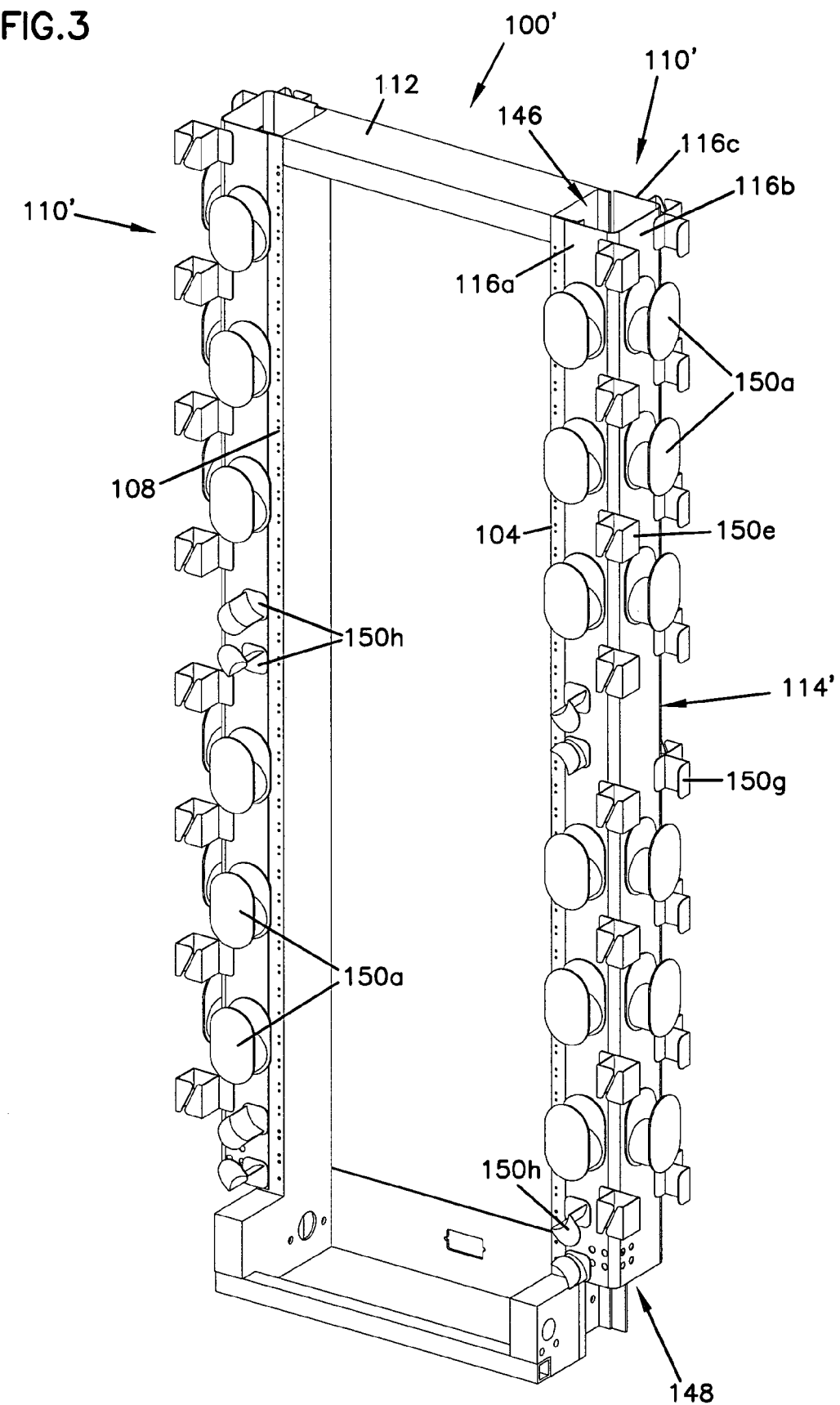
FIG. 3 is a perspective view of another cable management system.

Referring now to FIG. 3, another embodiment of the cable management system 100' is illustrated. In this embodiment, the cable management assembly 110' includes an end-rack panel 114' having first, second and third interface portions 116a, 116b, 116c. The end-rack panel 114' can be mounted to the side columns 104, 108 of a single standing telecommunication rack 112, as shown, or to an end column (104 or 108) of a telecommunication rack located at the end of a series of racks.

The end-rack panel 114' provides a user with three interface portions 116a-c having a plurality of discrete openings (not shown for purposes of clarity) to which various cable management devices 150 can be detachably secured. The three interface portions 116a-c in the illustrated embodiment form a channel-like configuration. Large cables can be routed into the channel-like configuration through a top or bottom opening 146, 148. In the alternative, large access holes (not shown) can be formed in the end-rack panel 114' through which cabling can be routed.

The cable management system 100' of FIG. 3 is illustrated with various cable management devices, such as spools 150a and cable channel guides 150e. FIG. 3 also illustrates some additional cable management devices that can be used with the cable management assemblies 110, 110' disclosed, including a cable retainer 150g and another embodiment of a radius limiter or edge protector 150h.

Referring now to FIGS. 4-9, one embodiment of a cable management assembly 10 having features in accordance with the principles of the present disclosure is illustrated. Similar to the previous embodiment, the cable management assembly 10 includes a cable management structure 14, such as a panel, back plane, or riser. The panel 14 has a length L extending between a top 15 and a bottom 17, and a width W extending between sides 19. The panel 14 also includes first and second mounting structures 18, 20, such as flanges, to mount or couple the cable management assembly 10 to adjacent telecommunication racks 112, as shown in FIG. 1. In the illustrated embodiment, the first and second mounting flanges 18, 20 are located along the sides 19 of the panel 14; although other mounting arrangements, such as top and bottom mounting flanges, are contemplated. The first and second mounting flanges 18, 20 have holes 22 that receive fasteners (not shown) for mounting the panel 14 to the telecommunication racks.

The panel 14 includes an interface portion 16 having a plurality of discrete openings 30 extending from a front side 26 of the panel 14 to a back side 28 of the panel. In this embodiment, the plurality of discrete openings 30 includes a first type of shaped apertures 32 and a second type of shaped apertures 34. The first and second types of shaped apertures 32, 34 are configured to secure cable management devices 50 to the interface portion 16 of the panel.

Figure 4:
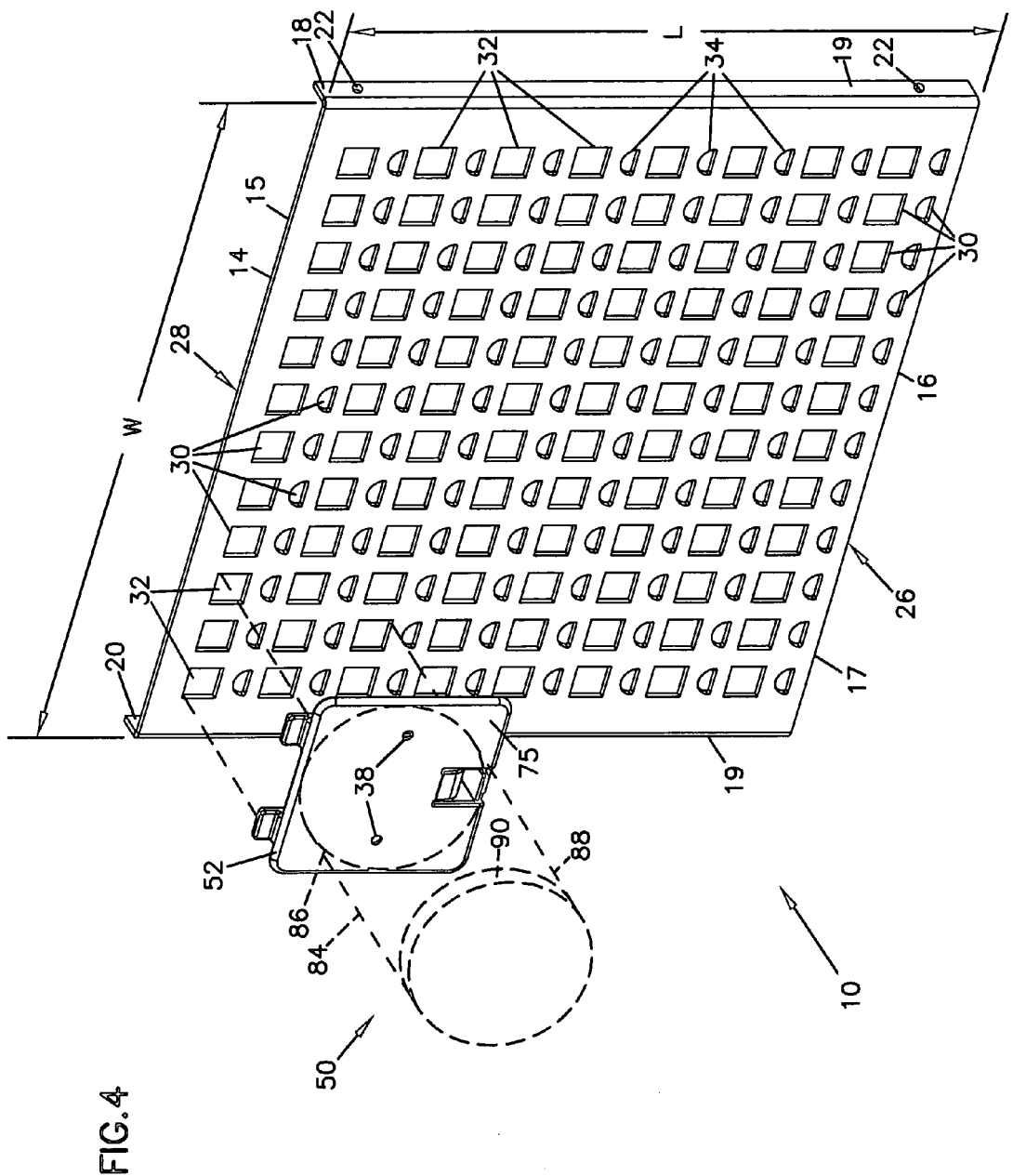
FIG. 4 is a front perspective view of a cable management assembly, in accord with the principles disclosed, that can be used to provide a cable management system similar to that of FIG. 1.

One embodiment of a cable management device 50 for use with the disclosed panel 14 is illustrated in FIG. 4. The illustrated cable management device 50 includes a back plate 52 having securing structure 60 (FIG. 8) configured to secure the device 50 to the panel 14. In FIG. 4, the cable management device 50 shown is a spool, although other cable management devices similar to the previously described devices (e.g. 150b-150h) can also be used. The spool 50 includes a spool body 84 having first and second ends 86, 88. A cable retainer 90 is located at the second end 88 of the spool body 84. Holes 38 are provided in the back plate 52 of the device 50 to receive fasteners (not shown) for attaching the spool body 84 to a front surface 75 of the back plate 52; although other ways of fastening or attaching the spool body to the back plate can be employed.

Referring now to FIGS. 1 and 4, the cable management assembly can include a single panel construction having a length that extends substantially from the top of the rack 112 to the bottom of the rack. In the alternative, as shown in FIG. 1, the cable management assembly can include one or more sections of panels defining an overall length that extends substantially from the top of the rack 112 to the bottom of the rack. Yet, in another embodiment, the system 100 may include a panel or panel sections that extend only partially between the top and the bottom of the rack 112. In the illustrated embodiment, the length L of the panel 14 is preferably between about 6 inches and 16 inches; more preferably between about 8 inches and 12 inches. Accordingly, a system 100 having six foot tall racks could include seven panels 14, for example, depending upon the requirements of the application.

Still referring to FIGS. 1 and 4, the width W of the panel 14 is configured to extend between the gap in the racks 112. Typically, the width W of the panel 14 is between about 2 inches and 18 inches; preferably, the width W of the panel is between about 5 inches and 12 inches.

Figure 5:
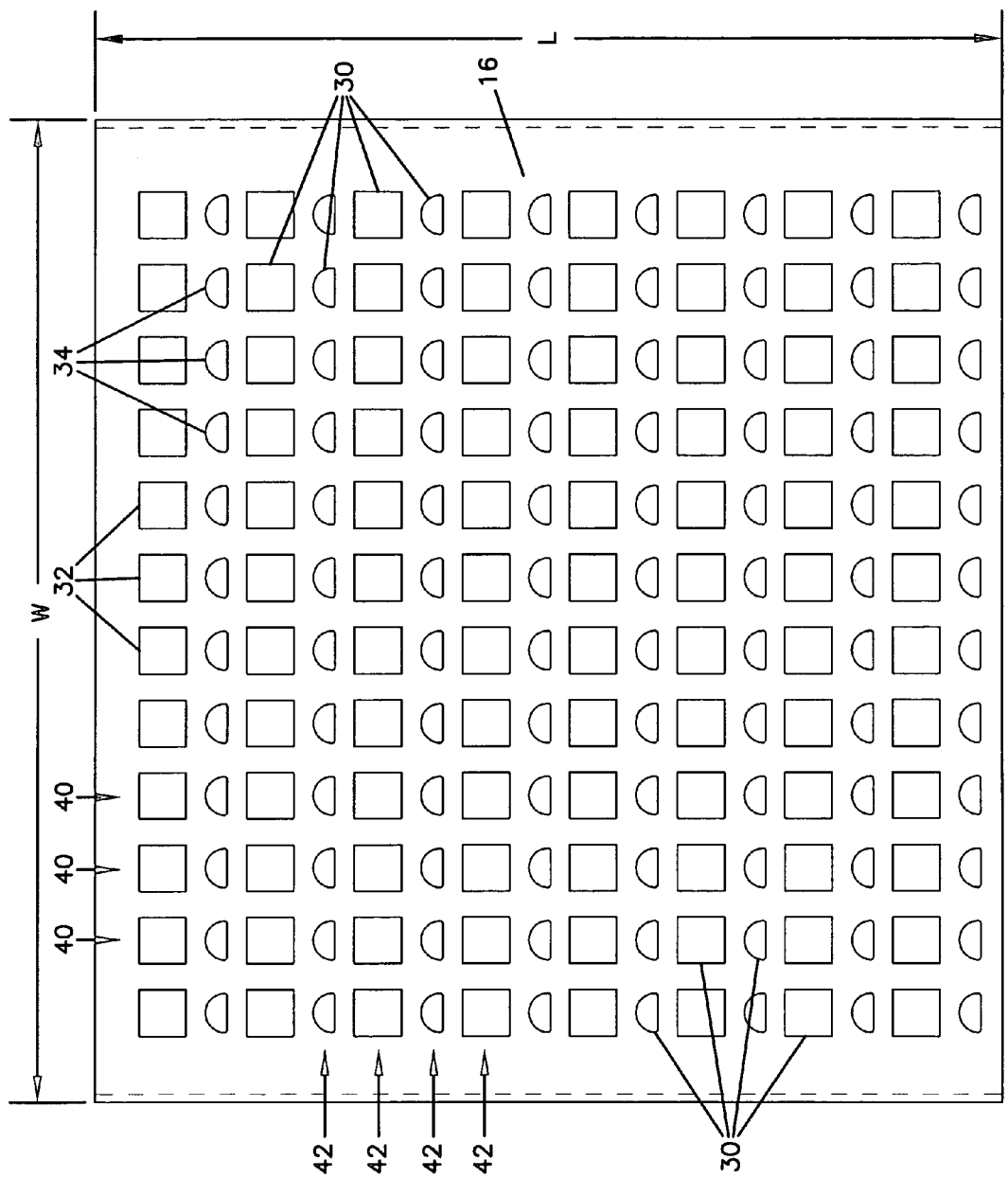
FIG. 5 is a front plan view of a panel of the cable management assembly of FIG. 4.

Referring now to FIG. 5, the first and second shaped apertures 32, 34 of the discrete openings 30 are arranged on the panel 14 in an array of vertical columns 40 and horizontal rows 42. The columns and rows 40, 42 of first and second shaped apertures 32, 34 define a repeating pattern that spans a majority of the width W of the panel and that extends along a majority of the length L of the panel 14. In this illustrated embodiment, the panel of the cable management assembly 10 (see also FIG. 4) includes twelve vertical columns 40 of discrete openings 30 that span across the width W of the panel 14, and sixteen horizontal rows 42 of discrete openings 30 that extend along the length L of the panel 14. Other embodiments having more or less columns or rows of discrete openings are contemplated. Preferably, the discrete openings 30 are arranged in a pattern that provides flexibility in placing and positioning cable management devices 50 (FIG. 4) along the panel 14. That is, the pattern preferably permits placement of the devices at various selected vertical and horizontal locations to provide a variety of cable management systems.

While the repeating pattern of the panel 14 includes a repeating pattern of vertical columns and/or horizontal rows, it will be appreciated that the arrangement of discrete openings of the illustrated embodiment of the present disclosure need not be limited to vertical and horizontal columns and rows. Rather, array arrangements oriented at various angular degrees from vertical and horizontal are within the scope of the present disclosure. In yet another alternative embodiment, the discrete openings 30 may be more randomly formed in the panel 14.

Still referring to FIG. 5, in the illustrated embodiment, the first and second shaped apertures 32, 34 of the panel 14 are each arranged in rows of similarity. That is, the discrete openings 30 of the panel 14 are arranged to provide either columns or rows of only the first shaped aperture 32 and only the second shaped aperture 34. The embodiment shown includes rows of first shaped apertures 32 and rows of second shaped apertures 34. The rows of the first shaped apertures 32 and the rows of the second shaped apertures 34 alternate along the length L of the panel 14. Other row and column patterns of the first and second shaped apertures 32, 34 can also be used.

Figure 6:
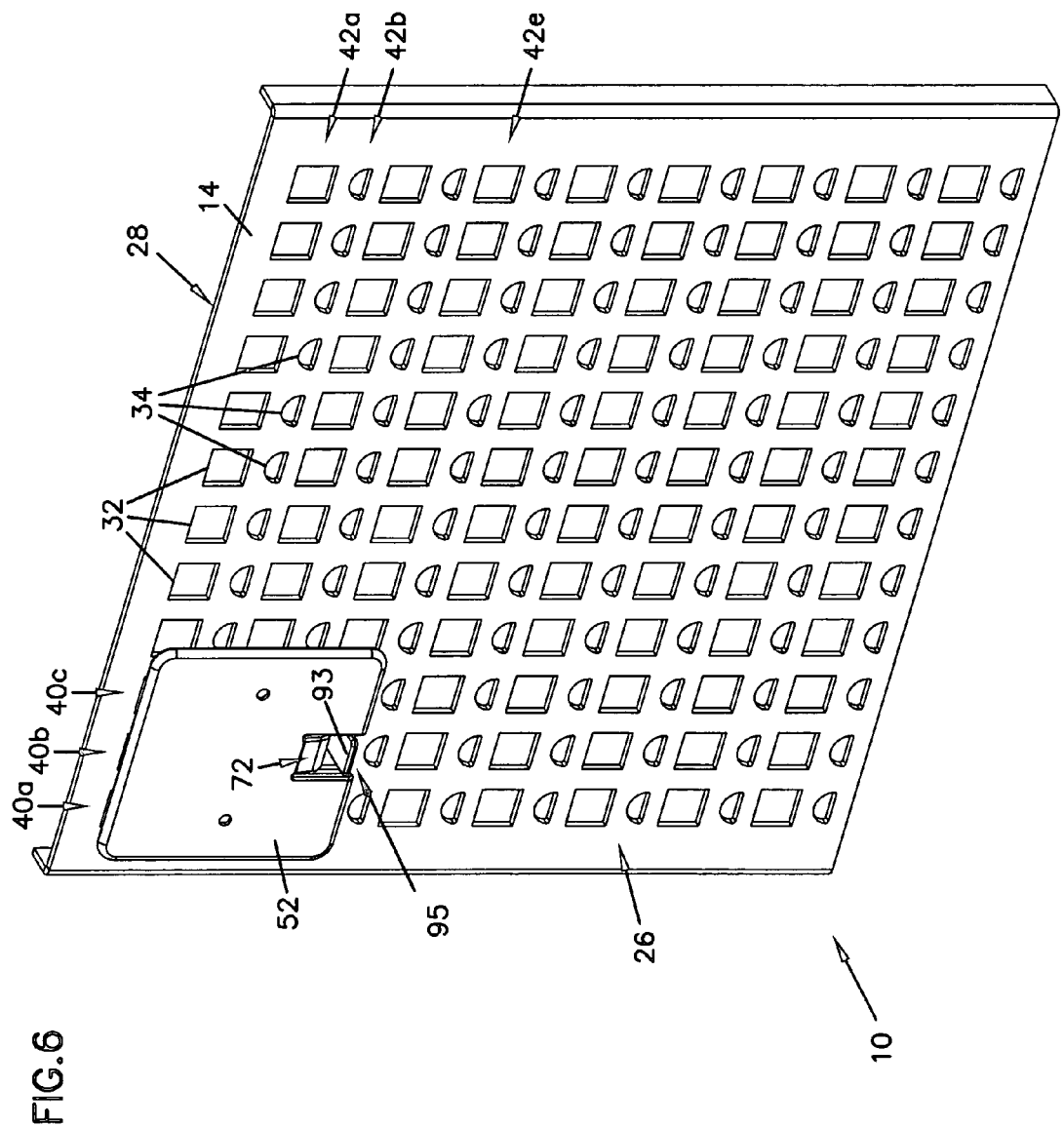
FIG. 6 is a front perspective view of the cable management assembly of FIG. 4, shown with a device (partially illustrated) attached to the panel.

Referring now to FIGS. 4 and 6, the first shaped apertures 32 in the illustrated embodiment are attaching apertures, and the second shaped apertures 34 are locating apertures. As will be described in greater detail hereinafter, the attaching apertures 32 receive mating elements of the securing structure 60 (FIG. 8) of the cable management device 50 to secure the device to the panel 14, while the locating apertures 34 orient the cable management device 50 and take up slack tolerance provided by the attaching apertures so that the cable management device 50 secures tightly to the panel at the selected location. In the illustrated embodiment, the attaching apertures 32 are square apertures, and the locating apertures 34 are half-circle apertures. Other shapes and configuration can be used in accord with the principles disclosed.

Referring now to FIGS. 6-9, the securing structure 60 of the cable management device 50 (FIG. 4) is configured to permit attachment and detachment of the device from the front side 26 of the panel 14. The securing structure 60 is formed on a rear surface 74 of the back plate 52 and includes first and second attaching elements 62, 64, a flexible tab 72, and a locating element 46.

The first and second attaching element 62, 64 of the securing structure 60 correspond to the shape of the attaching apertures 32. Each of the first and second attaching elements 62, 64 are located adjacent to a first edge, such as a top edge 54 of the back plate 52, for example. As shown, the first and second attaching elements 62, 64 are hooks having a generally squared configuration corresponding to the square attaching apertures 32 of the panel 14.

Referring to FIG. 9, each of the first and second hooks 62, 64 includes a neck portion 76 attached to or formed on the rear surface 74 of the back plate 52, and an extension portion 78. The neck portion 76 offsets the extension portion 78 from the rear surface 74 of the back plate 52 a distance D. The distance D accommodates the thickness of the panel 14 when the back plate 52 is attached to the panel 14.

Referring also to FIG. 8, the flexible tab 72 of the securing structure 60 detachably secures or fixes the cable management device 50 to the panel 14. The flexible tab 72 is centrally positioned adjacent to a second edge opposite the first edge, such as a bottom edge 56 of the back plate 52, for example. As shown, the tab 72 is an integral construction of the back plate. In particular, slots 80 are formed at and perpendicular to the bottom edge 56 of the back plate 52. The slots 80 produce a cantilever 92 having a first integral end 94 and a second free end 96 (FIG. 9). The cantilever 92 includes a U-shaped or hair-pin like construction 95 that defines first and second leg portions 98, 99. A snap-fit element 58 is located on one of the leg portions (e.g., 98) of the U-shaped construction 95. The snap-fit element 58 includes a ramped surface 66 and a shoulder surface 68. As will be described in greater detail hereinafter, the snap-fit element 58 provides an easy to use snap-fit connection.

Referring back to FIGS. 7 and 8, the locating element 46 of the securing structure 60 of the cable management device 50 corresponds to the locating aperture 34 of the panel 14. In the illustrated embodiment, the locating element 46 is a projection or key that projects outward from the rear surface 74 of the back plate 52. In an alternative embodiment, the locating apertures and the locating element 46 may be reversed. That is, the locating aperture maybe formed in the back plate 52 of the device 50 and the locating element 46 may be formed on the front side 26 of the panel 14.

The locating element 46 in combination with the locating aperture 34 ensure that the cable management device 50 is properly oriented relative to the panel 14. In particular, the locating element 46 is shaped such that the cable management device 50 can be mounted and attached to the panel 14 in only a particular orientation. This feature makes certain that the cable management device 50 is properly oriented for that particular device's intended use. In the illustrated embodiment, the locating element 46 is a half-circle projection that corresponds to the half-circle shape of the locating apertures 34. To attach the cable management device 50 to the panel 14, the orientation of the half-circle projection 46 must match the orientation of the half-circle locating aperture 34.

Referring still to FIGS. 7 and 8, the attaching apertures 32 are constructed to provide a somewhat loose fitting connection to ease attachment and detachment of the cable management device 50 to the panel, as will be described in greater detail hereinafter. The locating element 46 of the cable management device 50 also functions to take up the slack or tolerance in the loose fitting connection of the attaching apertures 32. In particular, the locating element 46 in combination with the locating aperture 34 provides a generally tight fitting connection. The tight fitting connection of the locating aperture 34 compensates for the easy-to-use but loose fitting connections of the attaching apertures 32 to provide an overall securing structure 60 that is both reliably secure and easy to use.

FIGS. 4, 6 and 7 illustrates the installation of the cable management device 50 to the panel 14. The installation is tool-free; that is, the cable management device 50 is designed to secure to the panel 14 without the use of tools or separate fastening components. In particular, the cable management device 50 secures to the panel 14 from one side by placing the first and second hooks 62, 64 within selected first and second attaching apertures 32a, 32b. The hooks 62, 64 are placed and positioned to engage an upper edge 82 (FIG. 7) of the first and second attaching apertures 32a, 32b.

With the hooks 62, 64 engaged, the flexible tab 72 is then inserted and snap-fit into a corresponding third attaching aperture 32c. In particular, the cable management device 50 is pivoted about the upper edge 82 of the square apertures 32a, 32b so that the ramped surface 66 of the snap-fit element 58 contacts a lower edge 83 of the third square aperture 32c. As the device 50 continues to pivot, the ramped surface 66 of the snap-fit element 58 causes the tab 72 to flex such that the leg portions 98, 99 of the U-shaped construction 95 squeeze together. Upon full insertion of the tab 72, the leg portions 98, 99 of the U-shaped construction 95 snap back, and in doing so, the shoulder surface 68 of the snap-fit element 58 contacts or engages the back side 28 of the panel 14.

While the flexible tab 72 is being inserted into the third attaching aperture 32c, the locating element 46 of the securing structure 60 is also engaging a corresponding locating aperture 34. If the device 50 is not properly oriented (i.e., the locating element 46 and the locating aperture 34 are not aligned), the flexible tab 72 will not fully insert within the third attaching aperture 32c. As previously described, the locating element 46 ensures that the device 50 is properly oriented, and takes up slack tolerance of the attaching apertures 32. When properly secured in this matter, cable management device 50 cannot be pulled, pushed, or pivoted out of position.

Referring now to FIGS. 6 and 7, the securing structure 60 of the illustrated device 50 utilizes four discrete openings 30 to provide an easy-to-use, but reliably attachment. In particular, the securing structure 60 utilizes three attaching apertures 32 and one locating aperture 34 to secure the device 50 to the panel 14. Two of the attaching apertures (e.g., 32a, 32b) are located within a single first horizontal row (e.g., 42a) of first shaped apertures, and the other attaching aperture (e.g., 32c) is located in a different horizontal row (e.g., 42e) below the first horizontal row 42a.

Still referring to FIGS. 6 and 7, the three attaching apertures 32 are each located in different vertical columns (e.g., 40a-c) of discrete openings 30. The vertical columns 40a-c of discrete openings 30 are adjacent to one another. The locating aperture 34 utilized is located in the same vertical column 40b as the third attaching aperture 32c, and in a horizontal row (e.g. 42b) of second shaped apertures 34 located between the horizontal rows 42a, 42e of first shaped apertures 32. It is contemplated that other arrangements of first shaped apertures 32 and corresponding securing structure 60 having a different spacing configuration can be used in accord with the principles disclosed.

To remove the cable management device 50 from the panel, the flexible tab 72 is first removed from the third attaching aperture 32c. As shown in FIG. 9, the flexible tab 72 includes an extension 93 located at the second end 96 of the cantilever 92. The extension 93 is positioned adjacent to the shoulder surface 68 of the snap-fit element 58 to define a notch 97. As can be understood from FIGS. 6 and 8, the flexible tab 72 is removed from the attaching aperture 32c by inserting a tool, such as a straight blade screwdriver, into the notch 97 and applying an upward force. The upward force squeezes the leg portions 98, 99 of the U-shaped construction 95 together so that that the shoulder surface 68 of the snap-fit element 58 disengages the panel 14. The flexible tab 72 can then be pivoted outward from the third attaching apertures 32c. At the same time, the locating element 46 is removed from the locating aperture 34. The hooks 62, 64 are then unhooked or disengaged from the first and second attaching apertures 32a, 32b to detach the entire cable management device 50 from the panel 14.

The present cable management assembly 10 provides flexibility in permitting a user to position any of the different cable management devices 50 at a plurality of selected locations on the panel 14. In particular, the preferred panel 14 is constructed to provide a plurality of placement coordinates (i.e. vertical and horizontal locations) from which a user may choose to position the cable management devices 50. Thus, with this design, a user is not limited to a pre-made, fixed cable management system, which may not fit a particular need. Similarly, with this design, the user reduces or eliminates modification and customizing costs associated with reworking a system to fit the particular need.

Another feature of the present cable management assembly 10 relates to the assembly's adaptability. In the illustrated embodiment, the securing structure 60 of the cable management devices 50 permits a user to easily attach and detach the device to and from the panel 14. This feature permits a user to modify a system's cable management strategy to accommodate growth in a quickly changing industry.

The above specification provides a complete description of the cable management assembly, system, and method. Since many embodiments of the invention can be made without departing from the spirit and scope of the invention, the invention resides in the claims hereinafter appended.

What is claimed is:

1. A cable management assembly, comprising:
  a) a panel defining a plurality of discrete openings, the plurality of discrete openings including first shaped apertures and second shaped apertures, the second shaped apertures having a different shape than the first shaped apertures, the different shape being independent of a different aperture orientation, the first and second shaped apertures being arranged in an array of columns and rows, the rows including rows of only first shaped apertures and rows of only second shaped apertures; and
  b) a fiber optic cable management device including securing structure for detachably securing the device at a selected location on the panel, the securing structure including:
    i) a flexible tab that engages one of the first shaped apertures, the flexible tab being accessible from a front side of the panel to permit attachment and detachment of the device from the front side of the panel without having to access a rear side of the panel; and
    ii) a locating element that engages one of the second shaped apertures;
  c) wherein the second shaped apertures and the locating element each have a shape that requires a user to mount the fiber optic cable management device in only one particular mounting orientation relative to the panel and that prevents rotation of the fiber optic cable management device relative to the panel.

2. The assembly of claim 1, wherein the panel includes mounting flanges having holes sized for receipt of fasteners for mounting the panel to adjacent telecommunication racks.

3. The assembly of claim 1, wherein the first and second shaped apertures repeat in alternating rows of only first shaped apertures and only second shaped apertures along a majority of a length of the panel.

4. The assembly of claim 1, wherein the first shaped apertures are square apertures sized to receive an attaching element of the securing structure of the cable management device.

5. The assembly of claim 4, wherein the second shaped apertures are half-circle shaped apertures.

6. The assembly of claim 4, wherein the attaching element of the securing structure of the cable management device include a hook attachment.

7. The assembly of claim 1, wherein the flexible tab provides a snap-fit connection configured to detachably secure the device to the panel.

8. The assembly of claim 1, wherein the securing structure of the device includes an attaching element, the attaching element being configured to engage the first shaped apertures to provide a loose-fitting connection.

9. The assembly of claim 8, wherein the locating element is configured to engage the second shaped aperture to provide a tight-fitting connection.

10. The assembly of claim 1, further including a plurality of different fiber optic cable management devices, each of the different devices including the securing structure for detachably securing the device at a selected one of a number of locations on the panel.

11. A method of assembling a cable management assembly, the method of assembling comprising the steps of:
  a) providing a panel defining a plurality of discrete openings, the plurality of discrete openings including first shaped apertures and second shaped apertures, the second shaped apertures having a different shape than the first shaped apertures, the different shape being independent of a different aperture orientation;
  b) mounting a cable management device at a selected location on the panel, the cable management device being mountable at the selected location in only one particular orientation, the step of mounting the cable management device including:
    i) engaging a hook attachment of the device to an edge of one of the first shaped apertures;
    ii) pivoting the device about the edge of the first shaped aperture and engaging a flexible tab of the device with another of the first shaped apertures; and
    iii) engaging a locating element of the device with one of the second shaped apertures, the locating element preventing rotation of the cable management device relative to the panel;
    iv) wherein the flexible tab of the device snap-fits within the first shaped aperture to secure the cable management device to the panel at the selected location, the flexible tab being accessible from a front side of the panel to permit attachment and detachment of the device from the front side of the panel without having to access a rear side of the panel.

12. The method of claim 11, further including orienting the cable management device relative to the panel such that the locating element aligns with the second shaped aperture.

13. The method of claim 11, further including mounting a plurality of cable management devices to the panel at selected locations.

14. The method of claim 11, further including detaching the cable management device from the panel and mounting the device at a different selected location.

15. The method of claim 11, further including mounting the panel between adjacent telecommunication racks.

16. A cable management device, the device including:
  a) a back plate having a front side that defines a front surface and a rear side that defines a rear surface, the back plate including securing structure for securing the device to a panel, the securing structure including:
    i) a hook attachment located adjacent to a first edge of the back plate; and
    ii) a flexible tab located adjacent to a second edge opposite the first edge, the flexible tab being an integral construction of the back plate that provides a snap-fit connection;
  b) a body connected to the front surface of the back plate; and
  c) a locating element that projects from the rear surface of the back plate, the locating element having a half-circle shape when viewed from the rear side of the back plate;
  d) wherein the securing structure and the locating element are arranged such that cable management device secures to the panel in only one particular mounting orientation;
  e) wherein the locating element prevents rotation of the device relative to the panel;
  f) wherein the flexible tab is accessible from a front side of the panel to permit attachment and detachment of the cable management device from the front side of the panel without having to access a rear side of the panel.

17. The device of claim 16, wherein the flexible tab includes a U-shaped construction having first and second leg portions constructed to squeeze together to provide the snap-fit connection.

18. The device of claim 16, wherein the body includes a spool body configured to hold fiber optic cabling.

19. The device of claim 16, wherein the body includes a radius limiter body configured to limit the bending radius of a cable placed over the body.

20. A cable management assembly, comprising:
  a) a panel defining a plurality of discrete openings, the plurality of discrete openings including first shaped apertures and second shaped apertures, the second shaped apertures having a different shape than the first shaped apertures, the different shape being independent of a different aperture orientation, the first and second shaped apertures being arranged in an array of columns and rows; and
  b) a fiber optic cable management device including securing means for detachably securing the device at a selected location on the panel, the securing means including:
    i) a flexible tab that engages one of the first shaped aperture, the flexible tab being accessible from a front side of the panel to permit attachment and detachment of the device from the front side of the panel without having to access a rear side of the panel; and
    ii) a locating element that engages one of the second shaped apertures;
  c) wherein the second shaped apertures and the locating element each have a shape that requires a user to mount the fiber optic cable management device in only one particular mounting orientation relative to the panel and that prevents rotation of the fiber optic cable management device relative to the panel.

21. The assembly of claim 20, wherein all of either the rows or all of the columns has only first shaped apertures or only second shaped apertures.

22. The assembly of claim 20, wherein the securing means includes an attaching element configured to engage a selected one of the first shaped apertures.

23. The assembly of claim 22, wherein the first shaped apertures are square apertures.

24. The assembly of claim 20, wherein the second shaped apertures are half-circle apertures.

25. The assembly of claim 20, wherein the flexible tab provides a snap-fit connection configured to detachably secure the device to the panel.

26. A cable management system, comprising:
 a) a panel having a length extending between a top and a bottom, and a width extending between first and second sides, the panel defining a repeated pattern of first shaped apertures and second shaped apertures, the second shaped apertures having a different shape than the first shaped apertures, the different shape being independent of a different aperture orientation; and
 b) mounting flanges located along each of the first and second sides of the panel, the mounting flanges being configured to mount the panel between adjacent telecommunication racks; and
 c) a cable management device including a back plate, a body connected to the back plate, and securing structure for securing the device to the panel, the securing structure including:
  i) a hook attachment located adjacent to a first edge of the back plate, the hook attachment being configured to engage one of the first shaped apertures;
  ii) a flexible tab located adjacent to a second edge opposite the first edge, the flexible tab being an integral construction of the back plate, the flexible tab being configured to engage another of the first shaped apertures, the flexible tab being accessible from a front side of the panel to permit attachment and detachment of the device from the front side of the panel without having to access a rear side of the panel; and
  iii) a locating element projecting from a rear surface of the back plate, the locating element being configured to engage one of the second shaped apertures, the locating element preventing rotation of the cable management device relative to the panel;
  iv) wherein the securing structure secures the device to the panel in only one particular orientation.

27. The system of claim 26, wherein the flexible tab includes a U-shaped construction having first and second leg portions, the first and second leg portions being configured to provide a snap-fit connection.

28. The system of claim 26, wherein the locating element has a half-circle shape that corresponds to the second shaped apertures defined by the panel.

29. The system of claim 26, wherein the hook attachment of the securing structure corresponds to the shape of the first shaped apertures defined by the panel, the first shaped apertures having a generally square shape.

30. The system of claim 26, wherein the repeated pattern defined by the panel includes rows of only first shaped apertures and rows of only second shaped apertures.

31. A cable management device, the device including:
 a) cable management structure; and
 b) a back plate arrangement to which the cable management structure attaches, the back plate arrangement including:
  i) a back plate having a front side that defines a front surface and a rear side that defines a rear surface;
  ii) a first hook attachment and a second hook attachment positioned adjacent to one another along an edge of the back plate;
  iii) a flexible tab integral with the back plate, the flexible tab providing a snap-fit connection between the cable management device and a panel, the flexible tab being accessible from a front side of the panel when the device is mounted to the panel, the accessible flexible tab Permitting attachment and detachment of the device from the panel without having to access a rear side of the panel; and
  iv) a locating elements that projects from the rear surface of the back plate, the locating element having a half-circle shape when viewed from the rear side of the back plate, the half-circle shape preventing rotation of the device when mounted to a panel;
  v) wherein the hook attachments, the tab, and the locating element are arranged such that cable management device secures to a panel in only one particular mounting orientation.

32. The device of claim 31, wherein the flexible tab includes a U-shaped construction having first and second leg portions constructed to squeeze together to provide the snap-fit connection.

33. The device of claim 31, wherein the cable management structure includes a spool configured to hold fiber optic cabling.

* * * * *

UNITED STATES PATENT AND TRADEMARK OFFICE
CERTIFICATE OF CORRECTION

PATENT NO. : 7,677,400 B2  Page 1 of 1
APPLICATION NO. : 11/101143
DATED : March 16, 2010
INVENTOR(S) : Bayazit et al.

It is certified that error appears in the above-identified patent and that said Letters Patent is hereby corrected as shown below:

Col. 9, line 18, claim 6: "include a hook attachment." should read --includes a hook attachment.--

Col. 10, line 26, claim 16: "such that cable management device secures" should read --such that the cable management device secures--

Col. 12, line 30, claim 31: "tab Permitting attachment and" should read --tab permitting attachment and--

Col. 12, line 33, claim 31: "a locating elements that projects" should read --a locating element that projects--

Col. 12, lines 39-40, claim 31: "such that cable management device secures" should read --such that the cable management device secures--

Signed and Sealed this

Twenty-third Day of November, 2010

David J. Kappos
*Director of the United States Patent and Trademark Office*